United States Patent
Otani (10) Patent No.: US 8,127,814 B2
(45) Date of Patent: Mar. 6, 2012

(54) SAFETY TIRE AND HOLLOW RING BODY FOR SAFETY TIRE

(75) Inventor: Koji Otani, Nasushiobara (JP)

(73) Assignee: Bridgestone Corporation, Tokyo (JP)

( * ) Notice: Subject to any disclaimer, the term of this patent is extended or adjusted under 35 U.S.C. 154(b) by 951 days.

(21) Appl. No.: 12/093,920

(22) PCT Filed: Oct. 10, 2006

(86) PCT No.: PCT/JP2006/321229
§ 371 (c)(1),
(2), (4) Date: May 29, 2008

(87) PCT Pub. No.: WO2007/058057
PCT Pub. Date: May 24, 2007

(65) Prior Publication Data
US 2009/0178747 A1 Jul. 16, 2009

(30) Foreign Application Priority Data

Nov. 17, 2005 (JP) .................................. 2005-332760

(51) Int. Cl.
*B60C 5/00* (2006.01)
*B60C 17/00* (2006.01)
(52) U.S. Cl. ..... 152/450; 152/152; 152/155; 152/331.1; 152/339.1; 152/516
(58) Field of Classification Search ............... 152/331.1, 152/332.1, 333.1, 334.1, 335.1, 336.1, 337.1, 152/338.1, 339.1, 340.1, 341.1, 342.1, 343.1, 152/344.1, 345.1
See application file for complete search history.

(56) References Cited

U.S. PATENT DOCUMENTS

| | | | | |
|---|---|---|---|---|
| 2,168,514 A | * | 8/1939 | Darrow | 152/342.1 |
| 2,173,065 A | | 9/1939 | Lee | |
| 2,690,779 A | * | 10/1954 | Rust | 152/331.1 |

FOREIGN PATENT DOCUMENTS

| | | |
|---|---|---|
| JP | 117202 C2 | 9/1936 |
| JP | 06-270604 A | 9/1994 |
| JP | 2002-087028 A | 3/2002 |
| JP | 2004-075039 A | 3/2004 |
| WO | 2006/098280 A1 | 9/2006 |

* cited by examiner

*Primary Examiner* — Justin Fischer (74) *Attorney, Agent, or Firm* — Sughrue Mion, PLLC

(57) ABSTRACT

It is to solve a problem of an elongation of a partition in a safety tire wherein hollow particles called as a foamable composition are filled in a hollow ring-shaped partition and to propose a safety tire with a partition structure sufficiently developing a function of hollow particles. In a safety tire comprising a tire-approved rim assembly formed by assembling a tire onto an approved rim, a chamber defined inside the assembly through a hollow ring-shaped partition and extending along the rim in a circumferential direction, and thermally expandable hollow particles filled in the chamber, each of which particles consisting of a continuous phase of a resin and a closed cell(s), a hollow ring-shaped sub-partition is disposed on at least radially outside of an outer peripheral portion of the partition and a tire internal pressure is applied to an inside of the sub-partition.

6 Claims, 13 Drawing Sheets

FIG. 1

(a) at normal tire  (b) under centrifugal environment  (c) at time of creeping

SAFETY TIRE AND HOLLOW RING BODY FOR SAFETY TIRE

TECHNICAL FIELD

This invention relates to a safety tire capable of safely and continuously running over a required distance even at puncture state after the tire is subjected to external injury or the like.

RELATED ART

There are various proposals on the safety tire capable of safely continuing the running over the required distance when the tire lapses into puncture state.

For example, Patent Document 1 discloses a technique wherein a tire is assembled onto an approved rim and a chamber extending along the rim in a circumferential direction is defined in an interior of the tire-approved rim assembly through a hollow ring-shaped partition and an expandable composition is filled into the chamber, and the partition can be enlarged by expanding the expandable composition at the time of tire injury to thereby revive a tire internal pressure through the enlarged partition.

Patent Document 1: JP-A-2004-75039

DISCLOSURE OF THE INVENTION

Problems to be Solved by the Invention

Figure 1:
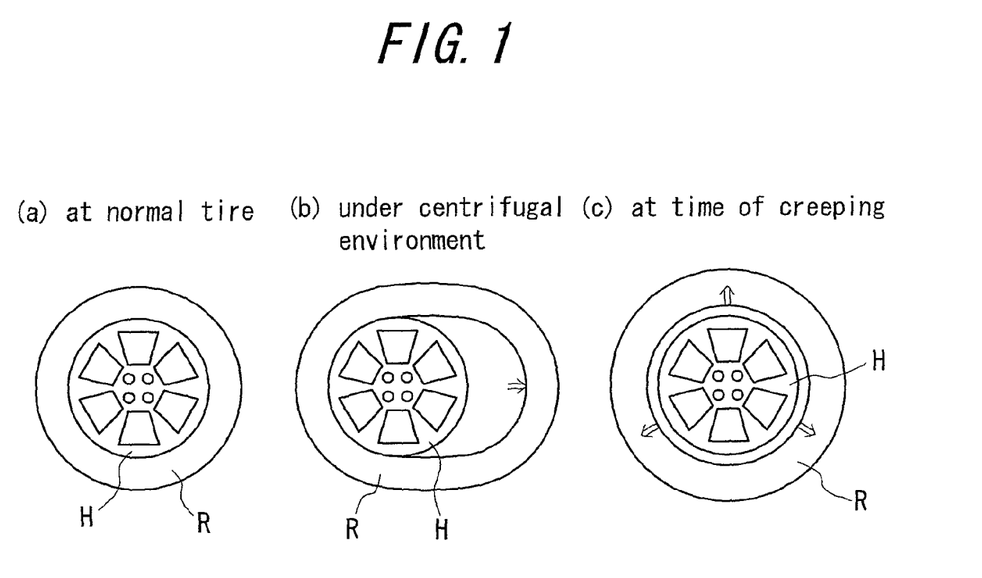
FIG. 1 is a section view illustrating a behavior of a hollow ring body in the conventional safety tire.

At this moment, the hollow ring-shaped partition comes into a problem in the stretching generated by centrifugal force during the running. That is, as the behavior of a hollow ring body R as a partition to a wheel H of the tire is shown in FIG. 1, the hollow ring body R adheres tightly to the wheel H at a normal state such as low-speed running time or the like shown in FIG. 1(a), but the stretching of the hollow ring body R is generated under a centrifugal environment typified by a high-speed running time as shown in FIG. 1(b). Particularly, this stretching induces vibrations during the high-speed running, which may badly affect the controllability of a vehicle. Moreover, when a phenomenon that the hollow ring body R becomes not returned at the stretched state or a creeping phenomenon occurs as shown in FIG. 1(c), the tightening effect to the wheel H is lost and the hollow ring body R freely moves in the interior of the tire, and hence the breakage of the hollow ring body R may be caused due to friction.

In order to avoid the above problem, it is required to give a creep resistance to the hollow ring body R or to reinforce the body with an inextensible material. However, the suppression of the stretchability in the ring means that the rim assembling becomes difficult, which is inadvisable.

It is, therefore, an object of the invention to solve the above problem in the safety tire filled with hollow particles, which are also called as the expandable composition, in the hollow ring-shaped partition and to propose a safety tire having a partition structure capable of sufficiently developing the function of the hollow particles.

Means for Solving Problems

That is, the summary of the invention is as follows.

(1) A safety tire comprising a tire-approved rim assembly formed by assembling a tire onto an approved rim, a chamber defined inside the assembly through a hollow ring-shaped partition and extending along the rim in a circumferential direction, and thermally expandable hollow particles filled in the chamber, each of which particles consisting of a continuous phase of a resin and a closed cell(s), characterized in that a hollow ring-shaped sub-partition is disposed on at least radially outside of an outer peripheral portion of the partition and a tire internal pressure is applied to an inside of the sub-partition.

(2) A safety tire according to item (1), wherein the sub-partition is a tube.

(3) A safety tire according to item (1), wherein the sub-partition is constituted with a double wall structure of the partition.

(4) A safety tire according to any one of items (1)-(3), wherein the partition is provided with a filter selectively passing only a gas discharged in the thermal expansion of the hollow particles.

(5) A hollow ring body for a safety tire comprising a tire-approved rim assembly formed by assembling a tire onto an approved rim, a chamber defined inside the assembly through a hollow ring-shaped partition and extending along the rim in a circumferential direction, and thermally expandable hollow particles filled in the chamber, each of which particles consisting of a continuous phase of a resin and a closed cell(s), characterized in that the hollow ring body is applied to the partition and has a double wall structure in at least an outer peripheral portion thereof.

EFFECT OF THE INVENTION

According to the invention, the stretching of the hollow ring body under the centrifugal environment and further the occurrence of creep are suppressed to maintain the hollow ring body at an appropriate arrangement, and hence the durability of the hollow ring body can be enhanced. Therefore, the tire internal pressure dropped or lost due to the puncture or the like is re-compensated by the action of the hollow particles brought through the intervention of the hollow ring body, so that the tire internal pressure enough to bear the vehicle weight cam be again obtained by the action of the hollow particles. Particularly, tension is applied to a tire skeleton portion even in the tire of puncture state, so that it is possible to conduct sound running even after the time of tire injury.

DESCRIPTION OF REFERENCE SYMBOLS

1 tire
2 rim
3 partition
4 chamber
5 hollow particles
6 sub-partition
7 valve
8 filter
9 foreign matter
10 wound site

BEST MODE FOR CARRYING OUT THE INVENTION

Figure 2:
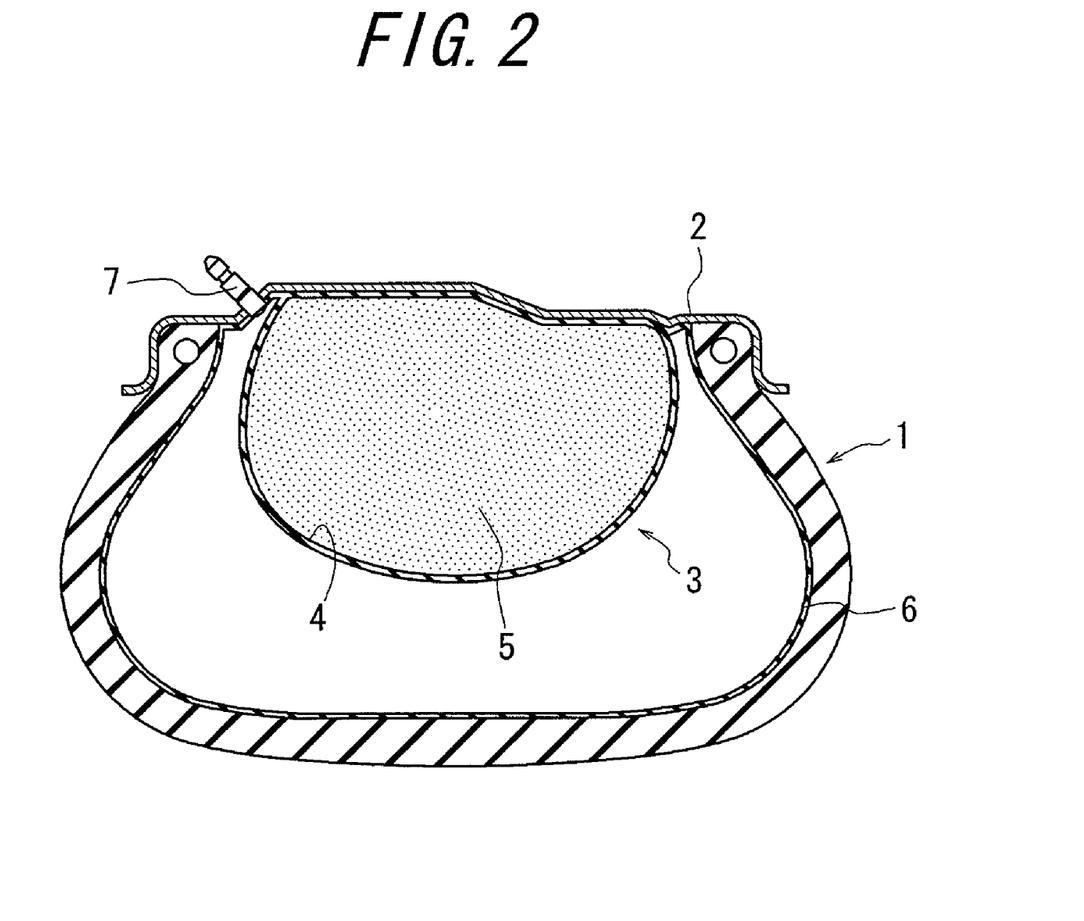
FIG. 2 is a widthwise section view of a safety tire according to the invention.

At first, the safety tire to be targeted in the invention will be described with reference to FIG. 2 showing its widthwise section.

Figure 3:
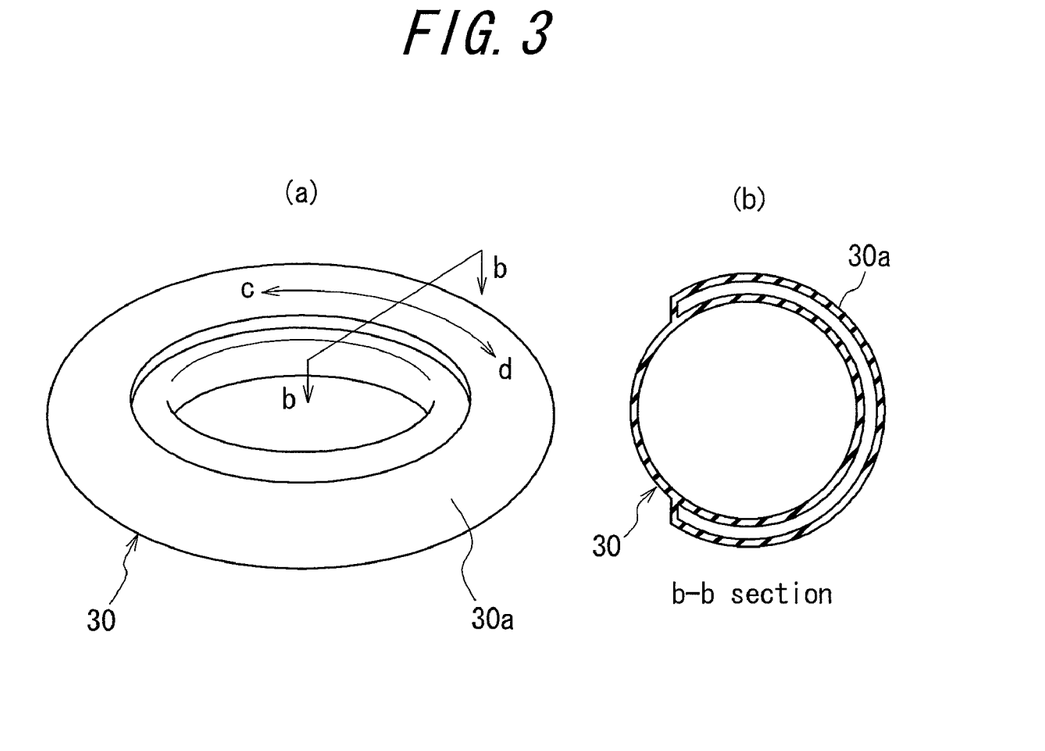
FIG. 3 is a schematic view illustrating a hollow ring-shaped partition used in the safety tire according to the invention.

That is, the safety tire shown in FIG. 2 is constituted by assembling a tire 1 onto a rim 2, defining a chamber 4 extending along the rim 2 in a circumferential direction inside the tire 1 defined by the tire 1 and the rim 2 through a partition 3 made from a hollow ring body 30 shown in FIG. 3, and filling thermal expandable hollow particles 5 each consisting of a continuous phase of a resin and a closed cell(s) in the chamber 4. Moreover, the tire 1 is not particularly required to limit its structure as long as it is according to a general rule of a tire for various automobiles, e.g. a passenger car tire. For example, the illustrated tire is a typically passenger car tire wherein a belt and a tread are arranged on a crown portion of a carcass toroidally extending between a pair of bead portions outward in a radial direction thereof in this order.

The partition 3 is arranged so as not to contact with an inner face of the tire 1 by disposing along a rim base of the rim 2. In such an arrangement, even if a big input is applied to the tire, since the partition 3 itself is flexible in addition to the above arrangement, it is not subjected to a large impact and never obstructs ride comfort in normal use.

As shown in FIG. 2, it is important that a hollow ring-shaped sub-partition 6 is disposed on at least radially outside of an outer peripheral portion of the partition. That is, at least an outer peripheral portion of the hollow ring body 30 shown in FIG. 3, a ⅔ portion on a periphery thereof in the illustrated embodiment has a double wall structure 30a, and an outer wall portion thereof is a sub-partition 6.

A gas such as nitrogen, air or the like is filled in an interior of the sub-partition 6, i.e. a space defined between the partition 3 and the sub-partition 6 through a valve 7 for the tire to provide a service internal pressure for the tire.

Figure 4:
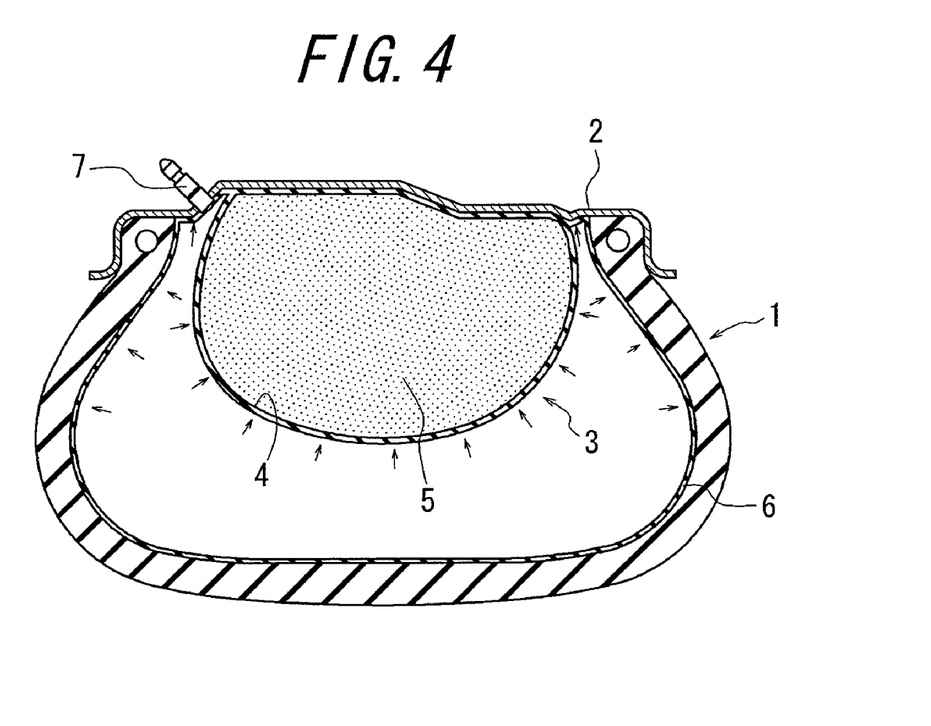
FIG. 4 is a diagrammatic view illustrating an action of a sub-partition in the safety tire according to the invention.

According to such a construction, the hollow ring-shaped partition 3 is pushed onto a bottom portion of the rim 2 by an internal pressure inside the sub-partition 6 disposed on the radially outside thereof as an action direction of the pressure is shown by arrows in FIG. 4, and hence it is avoided to cause stretching or creep in the hollow ring-shaped partition 3 even under an action of centrifugal force.

Figure 5:
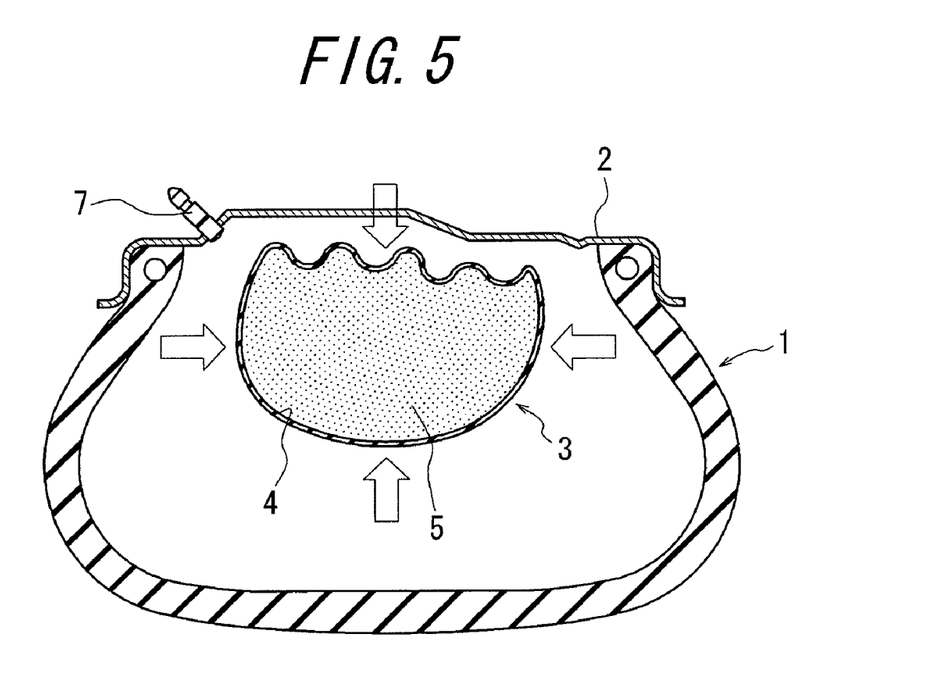
FIG. 5 is a diagrammatic view illustrating a behavior of a hollow ring body in the conventional safety tire.

Incidentally, in the conventional safety tire wherein the hollow ring body is disposed in the tire, even when the service internal pressure is applied, the pushing force toward the side of the rim is not caused. This is due to the fact that as shown in FIG. 5, the internal pressure is also applied to the space between the rim and the hollow ring body to offset the required force. As a result, the hollow ring body is only compressed toward a thinning direction, so that the effect of suppressing the stretching in c-d direction shown in FIG. 3(a) is not obtained.

On the contrary, it is made possible to have a structure that the internal pressure is not applied between the rim and the hollow ring body by disposing the sub-partition 6 for applying the internal pressure, and hence the ring body is pushed toward the rim over its full periphery, so that it is possible to effectively suppress the stretching in the c-d direction shown in FIG. 3(a).

Furthermore, according to this construction can be solved the above stretching problem without conducting the application of creep resistance by the reinforcement with a non-extensible material, so that there is obtained a safety tire not damaging the function as a hollow ring body receiving the hollow particles therein while ensuring the rim assembling property.

Figure 6:
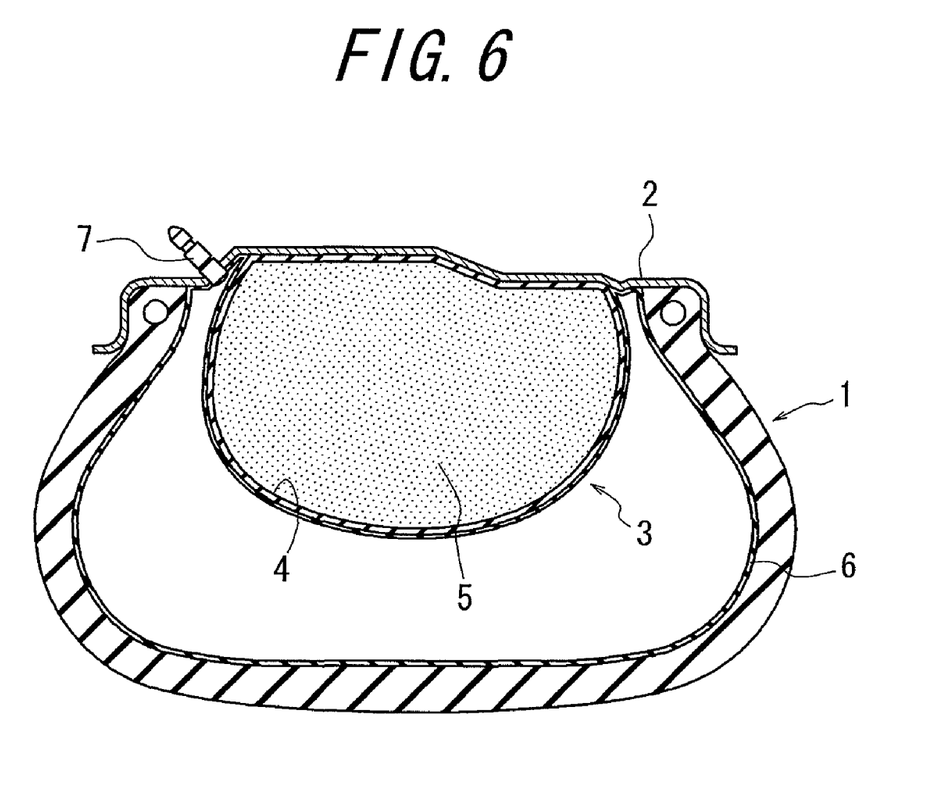
FIG. 6 is a diagrammatic view illustrating another embodiment of the sub-partition in the safety tire according to the invention.

Also, the sub-partition 6 is not necessarily united with the partition 3. The similar effect can be obtained by placing the sub-partition as a tube separated from the partition 3 in the tire as shown in FIG. 6.

Moreover, the partition 3 is preferable to be made from, for example, a urethane resin or rubber. That is, as the partition 3 is suitable a material being excellent in the creeping property to the centrifugal force during the running while ensuring a large elongation ratio. Further, a urethane resin having a low air permeability, particularly a polyurethane is preferable for keeping the applied internal pressure.

On the other hand, the sub-partition 6 is at a use state of closing to the inner face of the tire, so that it is required to have a large elongation ratio and a low air permeability likewise the partition 3 though the creeping property is not so important. Therefore, it is possible to select butyl rubber or the like used in an inner tube for the tire. However, when the partition and the sub-partition are integrally united with each other, it is required to consider the bonding property, so that it is good to use the same material as the partition. Moreover, this is not true when the partition and the sub-partition are separate bodies as shown in FIG. 6.

Figure 7:
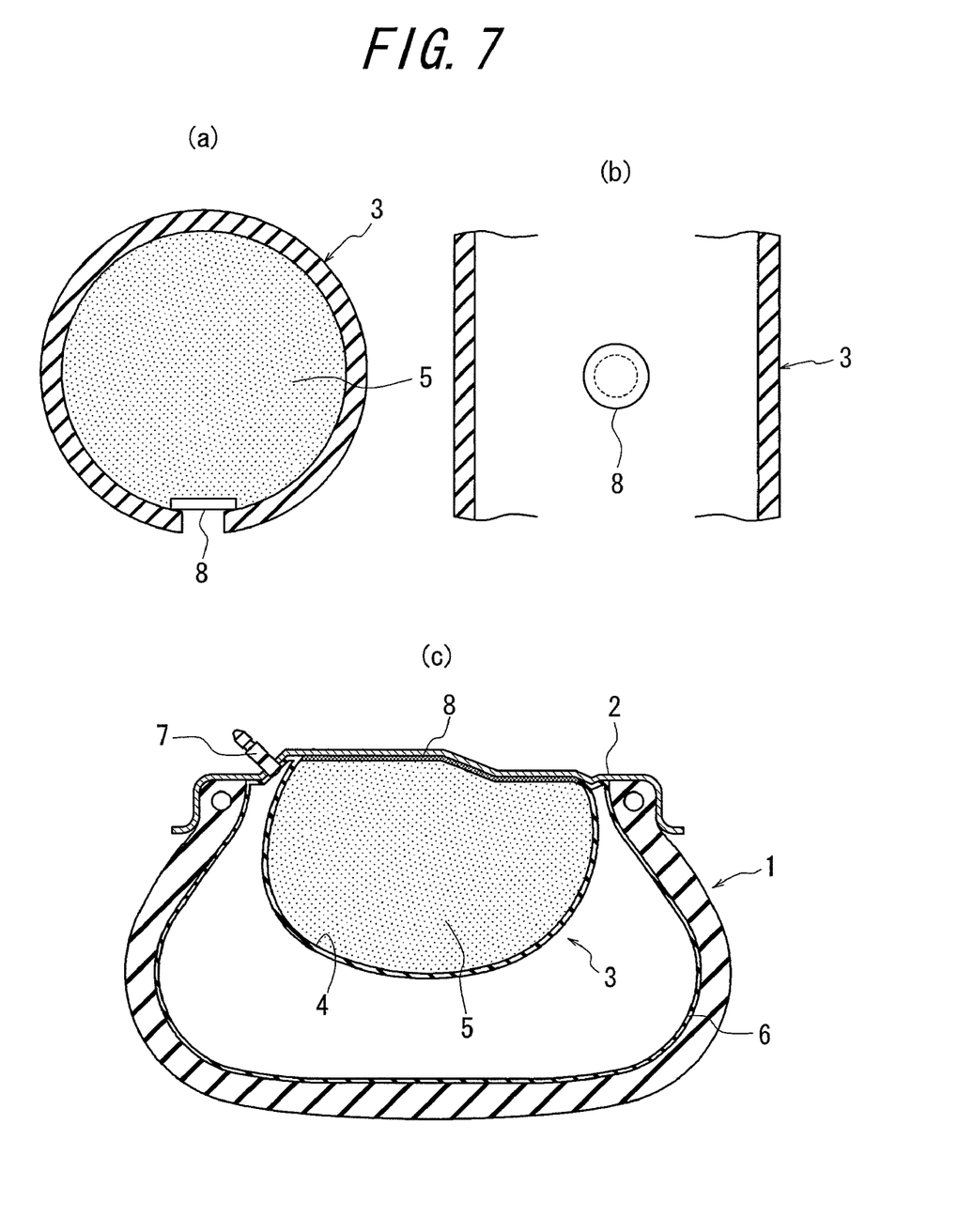
FIG. 7 is a diagrammatic view of a filter disposed in a partition.

Further, it is important that as shown in FIG. 7, a filter 8 selectively passing only a gas discharged in the heat-expansion of the hollow particles is disposed in at least one place of the partition 3 or the hollow ring-shaped partition. Also, the filter may be disposed in 4 to 6 equally divided places. By disposing a plurality of the filters may be smoothly conducted the passing of the gas to rapidly restore the tire height, but the mechanical strength of the hollow ring-shaped partition is lowered with the increase of the filter number, so that it cannot be said that it is good to unduly increase the filter number.

However, when the partition and the sub-partition are integrally united, it is required that the filter 8 is existent in a region shown in FIG. 7(c). Otherwise, the internal pressure applied to the space between the partition and the sub-partition is also introduced into the partition and hence the difference in the pressure between the inside and the outside of the partition is lost and the above pushing force is not generated. Moreover, this is not true when the partition and the sub-partition are separate bodies as shown in FIG. 6.

The hollow particles 5 are hollow bodies containing closed cells surrounded by a continuous phase of substantially a sphere-shaped resin and having a particle size distribution with an average particle size of about 20 μm~500 μm, or a spongy structural body including many small chambers defined by closed cells. That is, the hollow particles 5 are particles encapsulating the closed cell(s) not communicated with the exterior, wherein the number of the closed cells may be one or more. Here, "interiors of closed cells in hollow particle group" are totally represented by "hollow portion". Also, the feature that the hollow particle has the closed cell means that the particle has "a shell of a resin" for encapsulating the closed cell at a closed state. Furthermore, the continuous phase of the resin means "a continuous phase of a component composition constituting the shell of the resin".

The hollow particles are obtained by heat-expanding "expandable resin particles" as a starting material, i.e. particles formed by sealing a gas component in the resin as a foaming agent of a liquid state. The thus obtained hollow particles have an ability of expanding up to a limit of the resin as in the burst of a balloon, so that they may be further expanded by re-heating.

Figure 8:
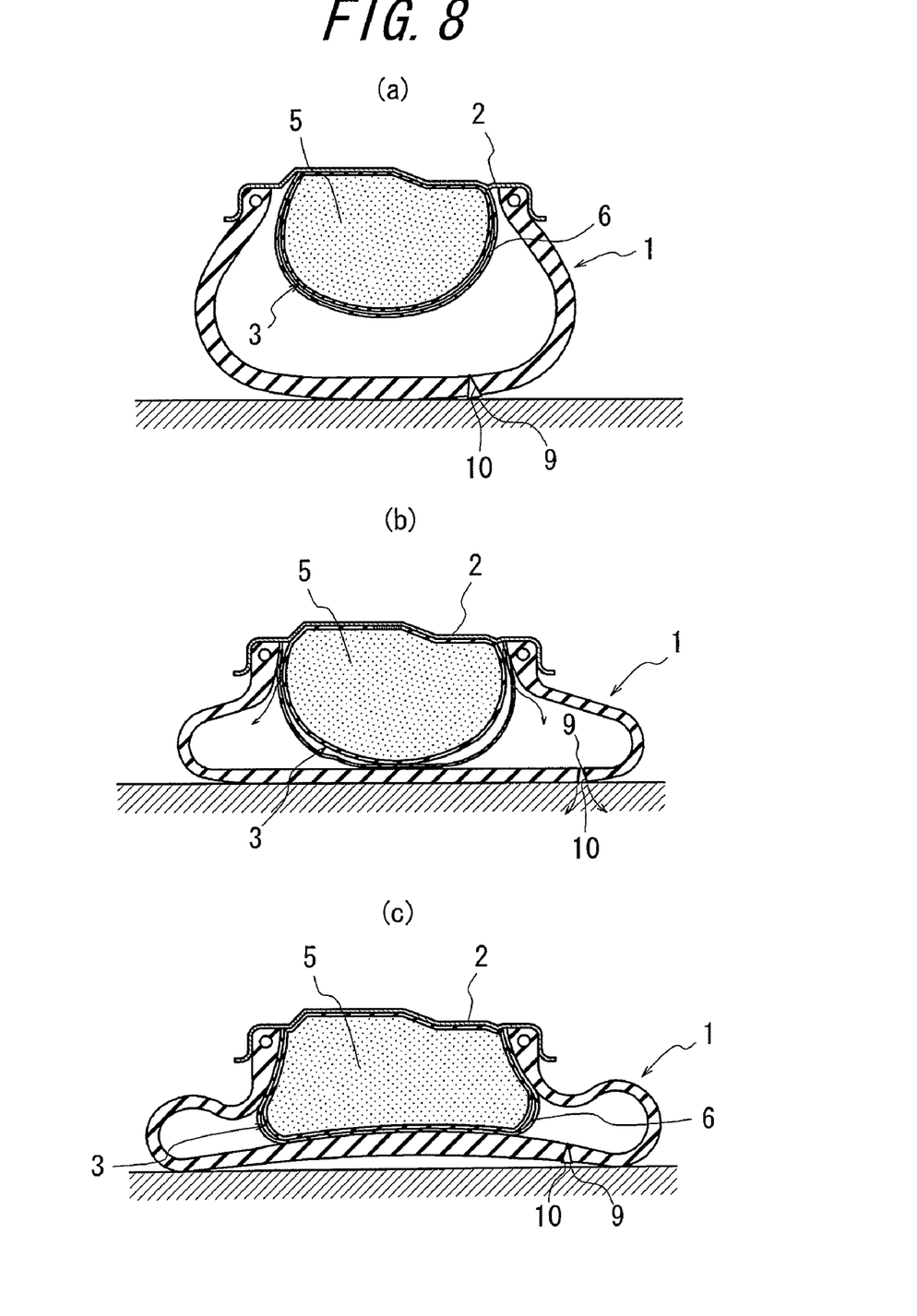
FIG. 8 is a diagrammatic view illustrating a behavior of a safety tire after the time of injury.

In the tire wherein the hollow particles 5 are disposed inside the chamber 4, if a foreign matter 9 such as a nail or the like sticks into the tore so as to arrive at the sub-partition 6 as shown in FIG. 8(*a*), the gas gradually leaks out from the tire 1. At this moment, the puncture on the general-purpose road is caused by the foreign matter sticking in the tire such as nail, bolt or the like, which is different from tear cut or the like produced when the tire is used on a rough road such as construction site or the like. In the case of such a puncture, the frequency of falling out the foreign matter from the tire is very low. In many situations, it is general to notice the puncture of the tire after the tire is left to stand at a state of retaining the foreign matter over about a night. Therefore, the rate of leaking the gas out from the wound site toward the outside of the tire is very slow, so that the tire internal pressure gradually drops out as shown in FIGS. 8(*b*) and (*c*).

Figure 9:
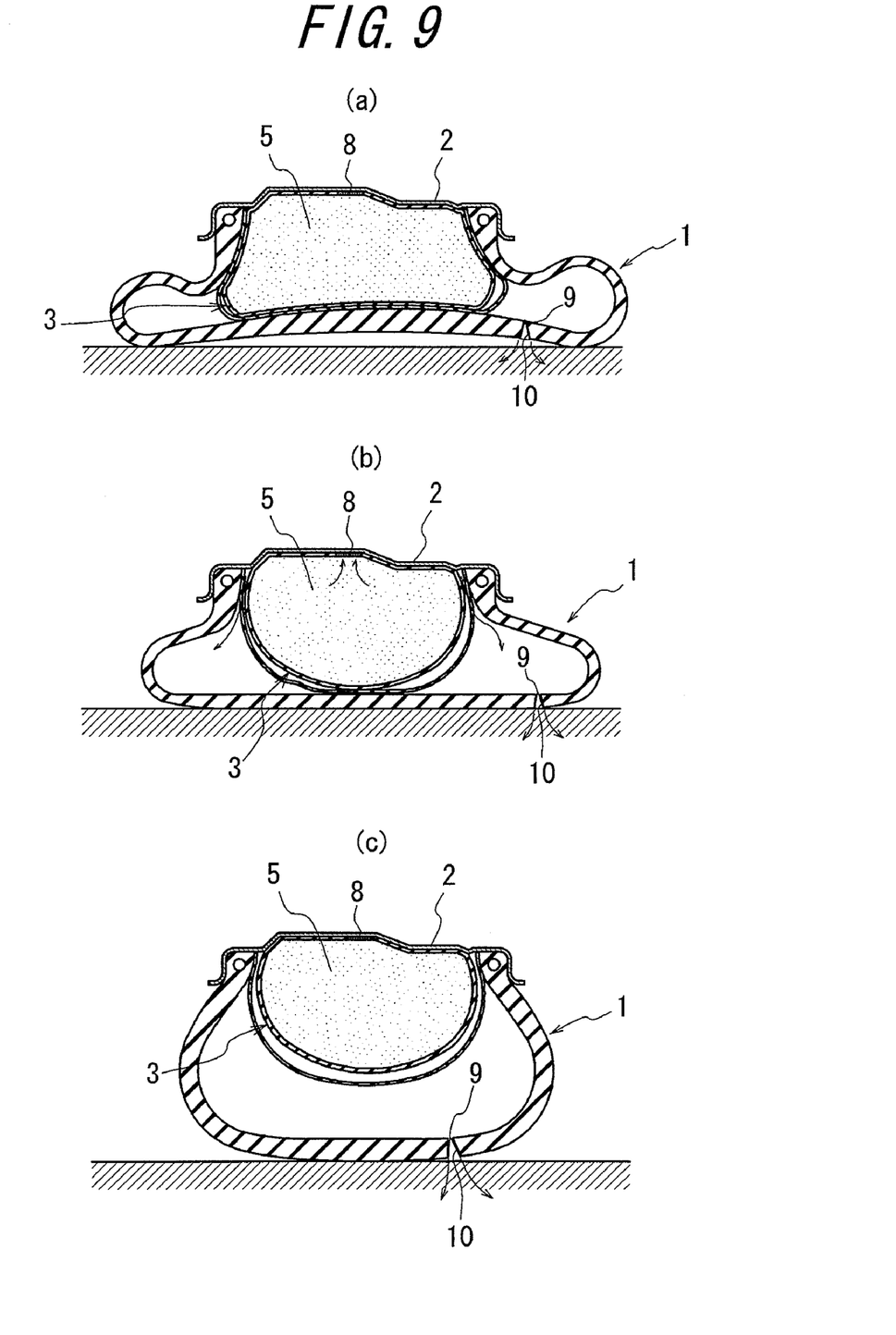
FIG. 9 is a diagrammatic view illustrating revival of an internal pressure in the safety tire according to the invention.

In the continuous running of the tire 1 having such a dropped internal pressure, as shown in FIG. 9(*a*), the running is continued at a state of contacting the partition 3 inside the tire 1 with an inner face of the tire 1 and under loading, and hence deformation input is repeatedly applied to the tire. As a result, the hollow particles 5 inside the partition 3 are rubbed with each other by such a deformation input to cause self-heating through friction to thereby raise the temperature of the hollow particles 5. When this temperature exceeds a heat-expansion starting temperature of the hollow particles, the shells of the particles start to soften.

Therefore, it is obviously required that the partition used in the invention is made from a starting material having a softening point higher than a maximum temperature arrived by the hollow particles, concretely the expansion starting temperature thereof. Incidentally, the sub-partition is not necessarily required to have the same temperature characteristics as in the partition, but a starting material causing fusion during the running is not preferable considering the handling for tire exchange in the running after the puncture.

Also, the capacity of keeping the internal pressure through the sub-partition is lost at a time of causing the sticking of the foreign matter, so that the sub-partition 6 is deformed by its own restoring force so as to return to an original state before the application of the internal pressure as shown in FIGS. 8 and 9, which does not obstruct the aforementioned behaviors of the hollow particles.

Figure 10:
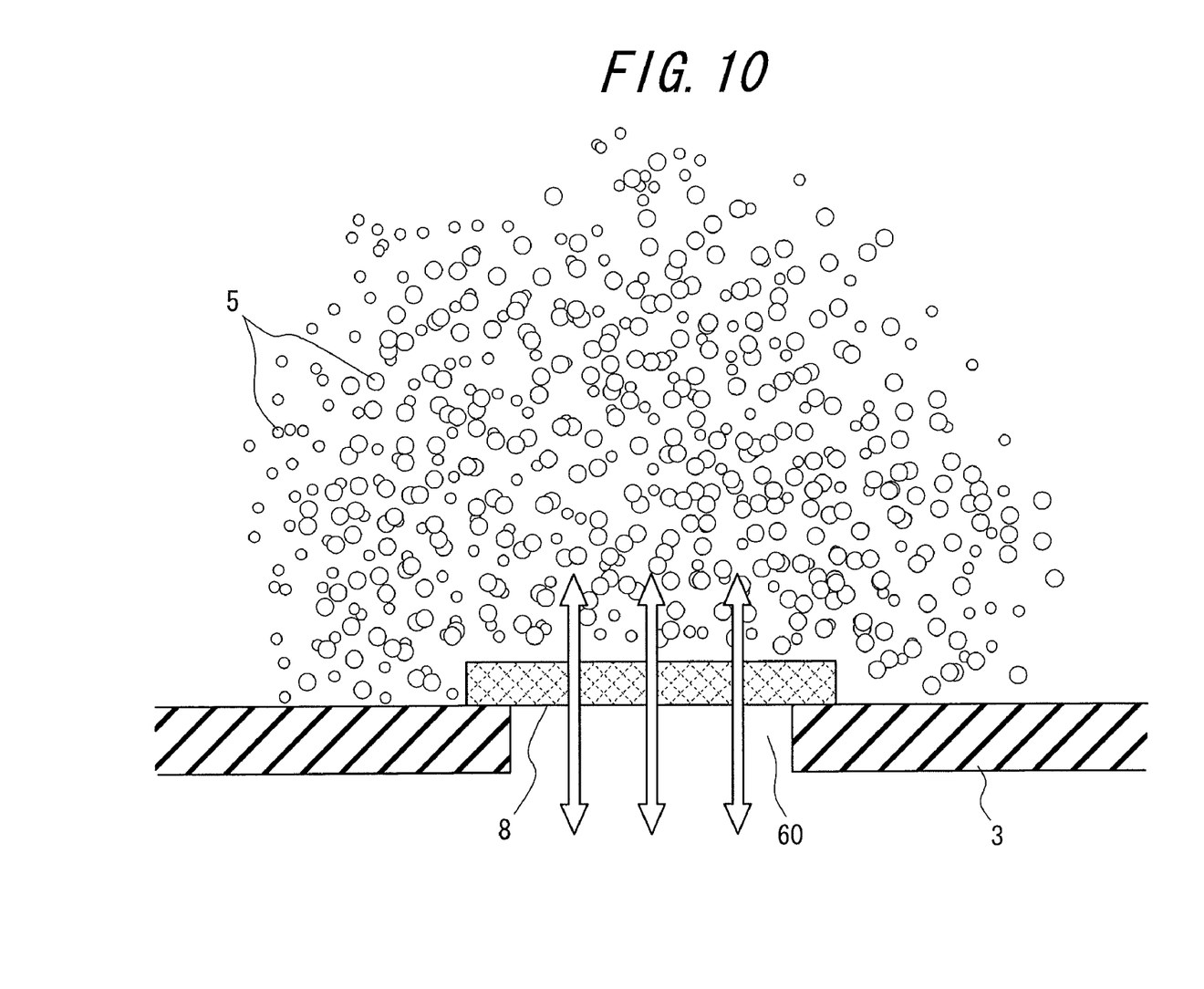
FIG. 10 is a diagrammatic view illustrating a function of a filter.

A part of the hollow particles raising the temperature through rubbing friction exceeds their expansion starting temperature and increases the gas permeability, and hence the gas encapsulated in the hollow portion of the hollow particles is discharged into the chamber 4 as shown in FIG. 9(*b*). As shown in FIG. 10, a filter 8 selectively passing only the gas discharged from the hollow particles 5 is disposed in the partition 3 in the form of closing a hole 60 formed at a predetermined position thereof, so that the discharged gas is supplied to an interior of the tire outside the chamber 4 through the filter 8. That is, the internal pressure in the chamber 4 is raised by the gas discharged from the hollow particles 5, while the pressure in the interior of the tire outside the chamber 4 is decreased due to the leakage of the gas from the wound site 10, so that the discharged gas in the chamber 4 moves toward the interior of the tire outside the chamber 4 through the filter 8.

The discharging rate of the gas discharged from the hollow particles is faster than the leaking rate of the gas from the wound site 10 of the tire. Because, as mentioned above, almost of the punctures re at a state of retaining the foreign matter in the damaged portion, so that the leaking rate of air in the tire is very slow. Even if the foreign matter is intentionally removed, the flexible rubber layer acts so as to close the wound site, so that the leaking rate of air in the tire becomes relatively slow. Therefore, as shown in FIG. 9(*c*), it is made possible to restore the internal pressure of the tire by the difference between the discharging rate of the gas from the hollow particles and the leaking rate of air from the wound site 10.

Here, there is explained a phenomenon using no filter. If the filter is not used, the gas discharged from the hollow particles retains in the partition, and hence the gas develops force of enlarging the partition. If the partition is enlarged at a rate exceeding the volume expansion of the hollow particles, a hollow ring having a volume larger than the total bulk volume of the hollow particles is formed. That is, an extra space is formed in the hollow ring, and the hollow particles become as a state of freely and smoothly moving inside the partition. At such a state, even if the deformation input is applied to the hollow ring due to the puncture running, the force can not be transferred to the hollow particles, and hence the sufficient restoring ability can not be developed.

Moreover, as the filter 8 selectively passing only the gas discharged from the hollow particles, it is preferable to use a heat-resistant filter made from at least one of glass fibers, alumina ceramic fibers, polyester fibers and nylon fibers. Because, it is not avoided that the filter is exposed to a high temperature environment owing to the tire height restoring mechanism of the hollow ring filled with the heat expandable hollow particles. Also, the form of the filter may be a sintered filter, or a non-woven fabric or a woven fabric. Furthermore, it is naturally required to have a heat resistance exceeding the expansion starting temperature of the hollow particles.

The discharge of the gas from the hollow particles contributing the aforementioned restoring the internal pressure is continued until the temperature of the hollow particles becomes lower than the heat-expansion starting temperature after the input to the partition 3 is lost, or until the internal pressure in the hollow particles and the tire internal pressure arrive at the equilibrium, whereby the restoring of the internal pressure is acted. Thereafter, as the discharge of the gas from the hollow particles is stopped and the leakage of the gas from the wound site 10 of the tire is promoted, the internal pressure is again dropped to fall the partition 3 inside the tire 1 into a state of contacting with the inner face of the tire 1 as shown in FIG. 9(*a*). And, the restoring of the internal pressure is attempted by repeating the input to the partition 3 as shown in FIGS. 9(*b*) and (*c*) to conduct heat generation of the hollow particles and the discharge of the gas. Through the course of repeating the decrease of the internal pressure and the restoring of the internal pressure as mentioned above, it is possible to safely conduct the continuous running over a required distance even after the puncture.

In contrast, in case of large damages such as side cut and the like, the restoring of the internal pressure can not be attained by the gas discharged from the hollow particles. Because, as shown in FIGS. 11(*a*) to (c), the gas discharged from the hollow particles is supplied to the outside of the chamber 4 through the filter 8, but is leaked out from the large wound site 10 of the tire 1 toward the outside of the tire.

Figure 11:
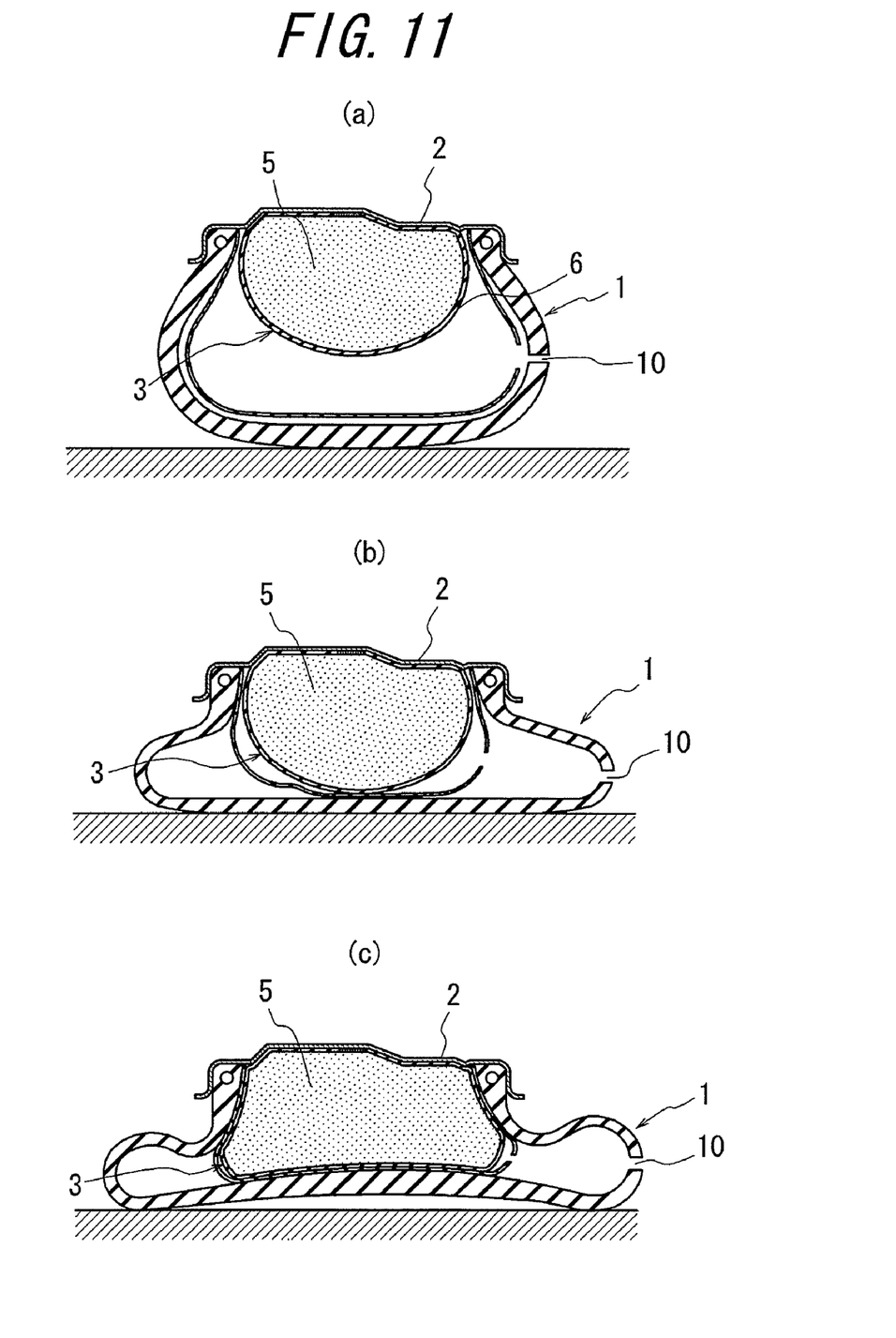
FIG. 11 is a diagrammatic view illustrating drop of an internal pressure in the occurrence of side cut.
Figure 12:
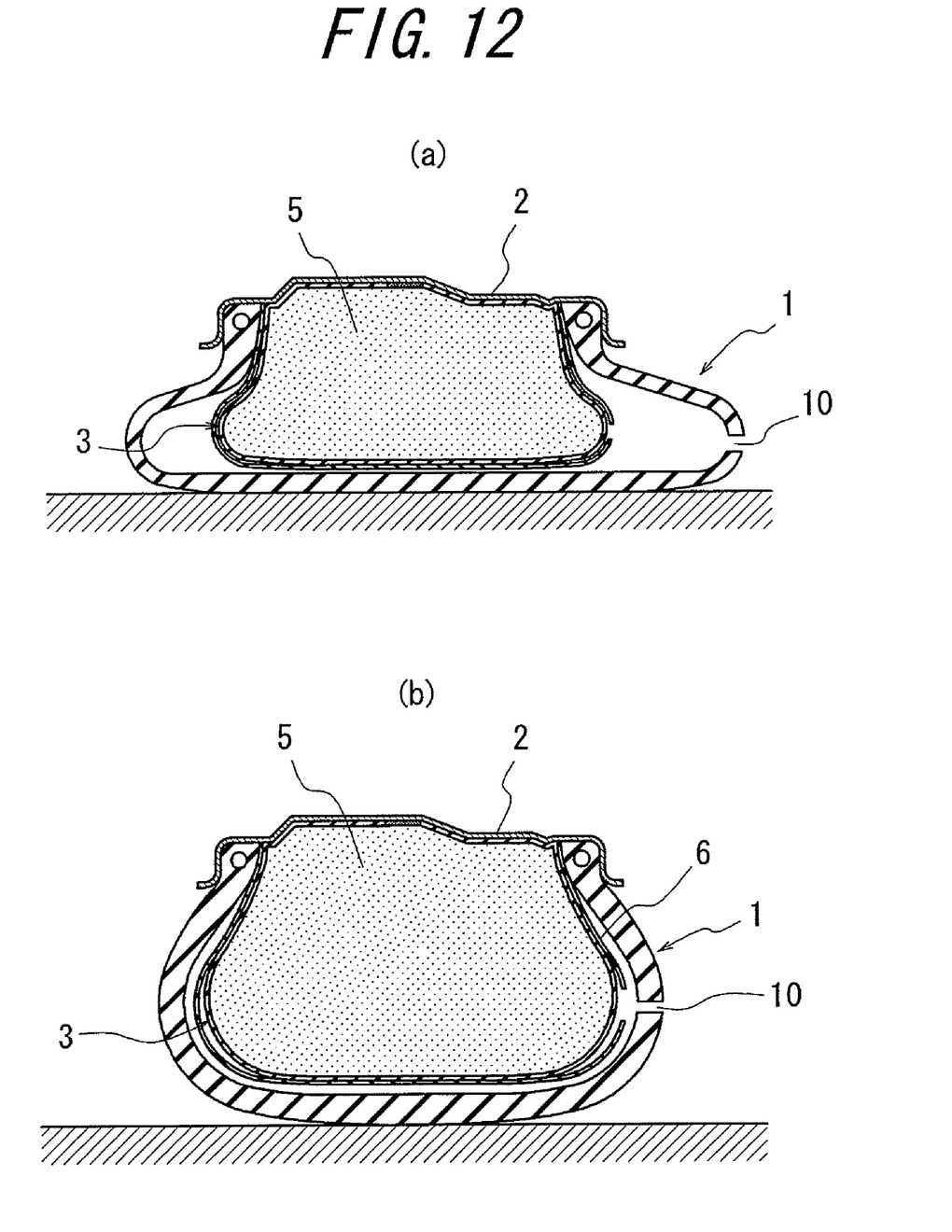
FIG. 12 is a diagrammatic view illustrating revival of an internal pressure in the safety tire according to the invention.

At the state shown in FIG. 11(*c*), the rubbing friction among the hollow particles 5 in the partition 3 is continued over a long time as compared with the slow puncture, whereby the temperature rise exceeding the expansion starting temperature is caused at the greater part of the hollow particles. Consequently, as shown in FIG. 12(*a*), the hollow particles change from the gas discharging stage to the volume expanding stage. Then, as shown in FIG. 12(*b*), the rigidity of the hollow ring yields to the expansion force of the hollow particles and starts to be enlarged, and hence the restoring of the tire height is attained by the hollow particles expanded so as to fill the interior of the tire.

Figure 13:
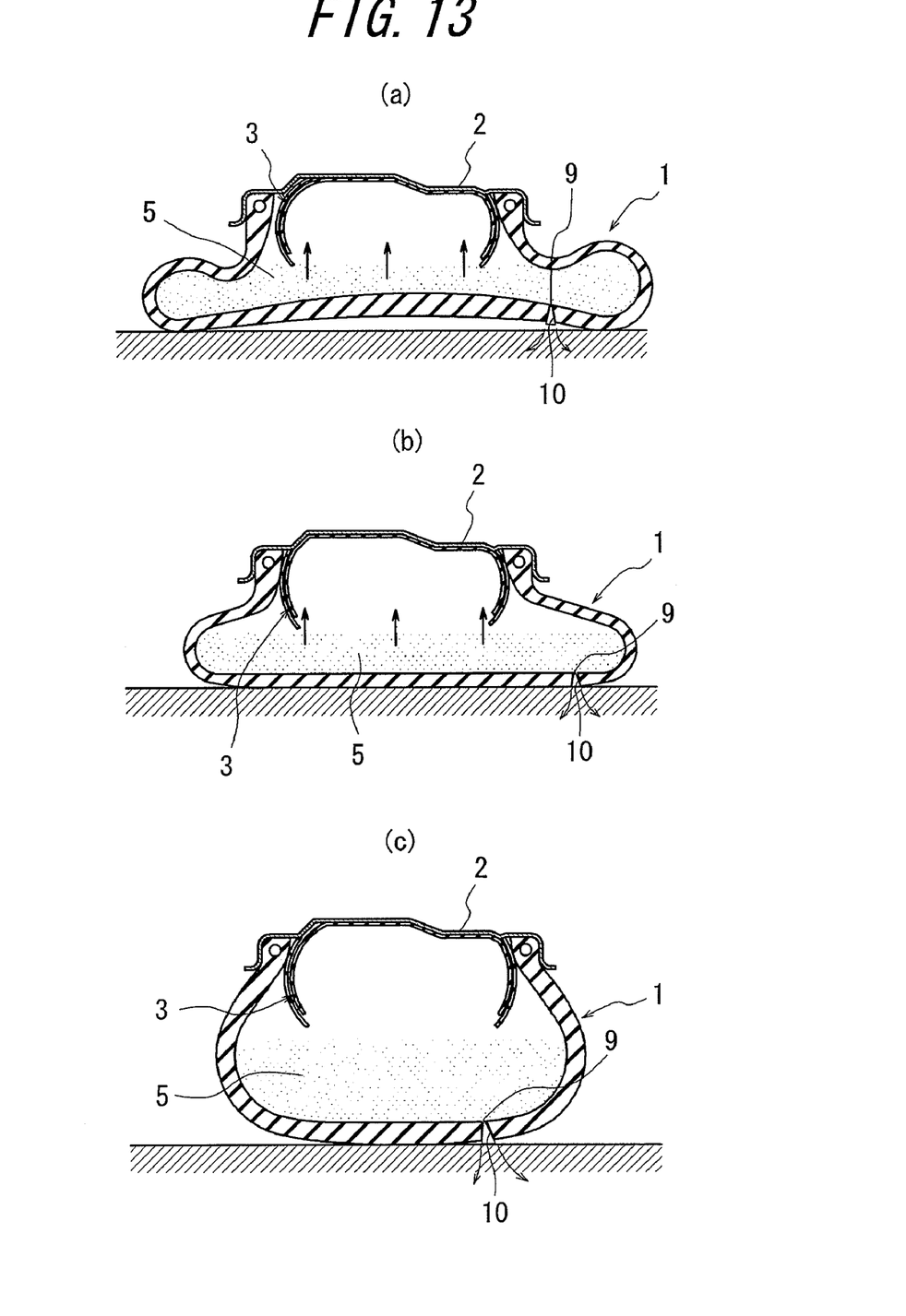
FIG. 13 is a diagrammatic view illustrating revival of an internal pressure in the safety tire according to the invention.

At this moment, the case that the partition 3 made from, for example, urethane resin is broken by a big deformation input to the partition 3 at a state of discharging an encapsulated internal pressure from the hollow particles is explained with reference to FIG. 13. As shown in FIG. 13(*a*), the hollow particles 5 in the partition 3 is already heated by the deformation input to the partition 3 to discharge the gas, so that as shown in FIGS. 13(*b*)-(*c*), it is possible to restore the dropped internal pressure by the same mechanism as previously mentioned.

Also, the hollow particles 5 scattered into the interior of the tire 1 due to the breakage of the partition 3 clog the wound site 10 of the tire 1, which contributes to suppress the rapid dropping of the tire internal pressure.

That is, the wound site 10 is a path leaking the gas in the tire chamber, and a path length thereof substantially corresponds to the thickness of the tire. The hollow particles according to the invention can enter into the path at a "compact" state to clog the path with a greater number of the hollow particles. Further, as the pressure in the tire chamber is increased by the aforementioned internal pressure restoring mechanism, tension is applied to the tire skeleton to decrease the inner diameter of the wound site squeezedly. As a result, compression force is applied to the hollow particle group entered into the wound site at the compact state so as to squeeze for the side of the tire by the increase of the pressure in the tire chamber. Since the pressure in the hollow portion is high in the hollow particles according to the invention, reaction force resulted from the pressure in the hollow portion is caused to the compression force, the degree of compactness can be enhanced to clog the wound site to such an extent that the gas in the tire chamber does not substantially leak out even in the wound site having a larger inner diameter.

Therefore, the wound site resulted in the puncture can be clogged with the hollow particles instantly and surely.

Even when a material having a low strength is used in the partition 3 and the hollow particles 5 are released outside the partition 3 by the breakage of the partition 3 prior to the heat generation of the hollow particles 5, it is possible that the hollow particles 5 subjected to the supply of heat generated in the tire cause the volume expansion or leakage of the encapsulated gas to restore the tire height in the same manner. That is, in the tire 1 of the punctured state, the distortion quantity of the tire is increased and the tire volume is decreased with the dropping of the internal pressure, so that the hollow particles 5 are subjected to compression and shear inputs to cause heat generation while sandwiching between the inner face of the tire and the inner face of the rim, whereby the above restoring of the internal pressure is achieved.

Furthermore, when the tire is run while contacting the inner faces with each other, the mechanical breakage of the hollow particles 5 sandwiched in the contacted portion is caused to promote the discharge of the encapsulated gas.

Incidentally, it is considered that the volume expansion of the hollow particles 5 and the discharge of the gas encapsulated therein as the above phenomena can not be separated clearly and are frequently developed in parallel simultaneously.

In order to realize the re-supplement of the internal pressure through the hollow particles 5, the filling amount of the hollow particles 5 in the chamber 4 is preferable to be a bulk volume of 20% to 60% per the volume of the tire. That is, when the bulk volume of the hollow particles 5 is less than 20%, the total amount of the gas discharged from the hollow particles is less and the good restoring ability is not obtained, but also input to the hollow ring in the puncture is lacking and the sufficient heat generation is not obtained. While, when the bulk volume exceeds 60%, the trouble in the mounting of the tire onto the wheel is big and the practicality becomes poor. Therefore, it is required to properly design the hollow ring-shaped partition in accordance with the tire size applied to the invention.

EXAMPLE

As a hollow ring body of a double structure, the partition is formed by rendering a polyurethane sheet of 2 mm in thickness (ELASTOLLAN S90A55N, made by BASF) into a circular tube having an inner diameter of 300 mmφ and an outer diameter of 520 mmφ, while the sub-partition is formed by rendering a polyurethane sheet of 1 mm in thickness (ELASTOLLAN 1180A10, made by BASF) into a circular tube having an inner diameter of 350 mmφ and an outer diameter of 550 mmφ. The polyurethane sheet used herein is merely an example, and the other sheet, for example, a polyurethane sheet made by Nippon Miractran Co., Ltd.) may be used. Also, the same material may be used in the partition and the sub-partition.

Moreover, the above size should be properly set in accordance with the tire size to be applied.

Two circular tubes of each of the above sheets are prepared and shaped into a hollow ring body by using a supersonic welding machine. The welding method used herein is merely an example, and the other welding method such as a high frequency induction heat-welding or the like may be used.

The sheet of 2 mm in thickness and the sheet of 1 mm in thickness are concentrically piled one upon the other and the inner diameter side of the sheet in 1 mm in thickness is welded to a side face of the sheet of 2 mm in thickness. The thus obtained two welded bodies are overlapped with each other at an opposed state, wherein the outer diameter sides of the sheet of 2 mm in thickness are welded to each other and then the inner diameter sides of the sheet of 2 mm in thickness are welded to each other. Finally the outer diameter sides of the sheet of 1 mm in thickness are welded to each other to prepare a hollow ring body of a double structure having a section structure shown in FIG. 3(*b*).

Also, only two sheets of 2 mm in thickness are used to prepare a hollow ring body of a single structure, i.e. a hollow ring body of only a partition having no sub-partition.

As parts to be assembled in the thus obtained hollow ring body are mentioned a valve for filling air, a hollow particle filling port and a filter. Each of these parts is important to be previously assembled into the sheet before the above welding work.

As to the valve for filling air to be assembled into the sheet of 1 mm in thickness, it is required to select a position not causing the trouble in the assembling by considering a position of a valve hole in a wheel to be applied. Also, the hollow particle filling port and the filter to be assembled into the sheet of 2 mm in thickness are required to be assembled in a position butting out of the sheet of 1 mm in thickness, i.e. a region of 300 mmϕ to 350 mmϕ in the illustrated embodiment.

Moreover, the hollow particle filling port and the filter are not particularly limited in the form, but are required to be made from a material having temperature characteristics required for the partition, i.e. a softening point higher than the expansion starting temperature of the hollow particles.

Into the interior of the hollow ring bodies are filled 150 g of EXPANSEL 092DE120 made by Aquzo Novel Co., Ltd. as hollow particles. The hollow particles used herein are merely an example, and the other hollow particles such as MICROSPHERE made by Matsumoto Yushi Seiyaku Co., Ltd. or the like may be used. The particles are required to be filled in an amount required for the expansion characteristics of the particles.

After the hollow ring body of the double structure is inserted into an interior of a tire having a tire size of 195/50R15, the tire is assembled into a wheel of 6.0J-15 and a maximum air pressure is filled into an interior of a sub-partition to prepare a safety tire of a ring-tube one piece type shown in FIG. 2.

Also, a hollow ring body of a single structure is inserted into a tire having the same tire size, and a commercially available inner tube for the tire is inserted into an outside of the hollow ring body, i.e. a space between the tire and the ring, which is assembled onto a wheel of 6.0J-15. Thereafter, a maximum air pressure is filled into an inner tube to prepare a safety tire having a separate type of ring and tube as shown in FIG. 6.

Figure 14:
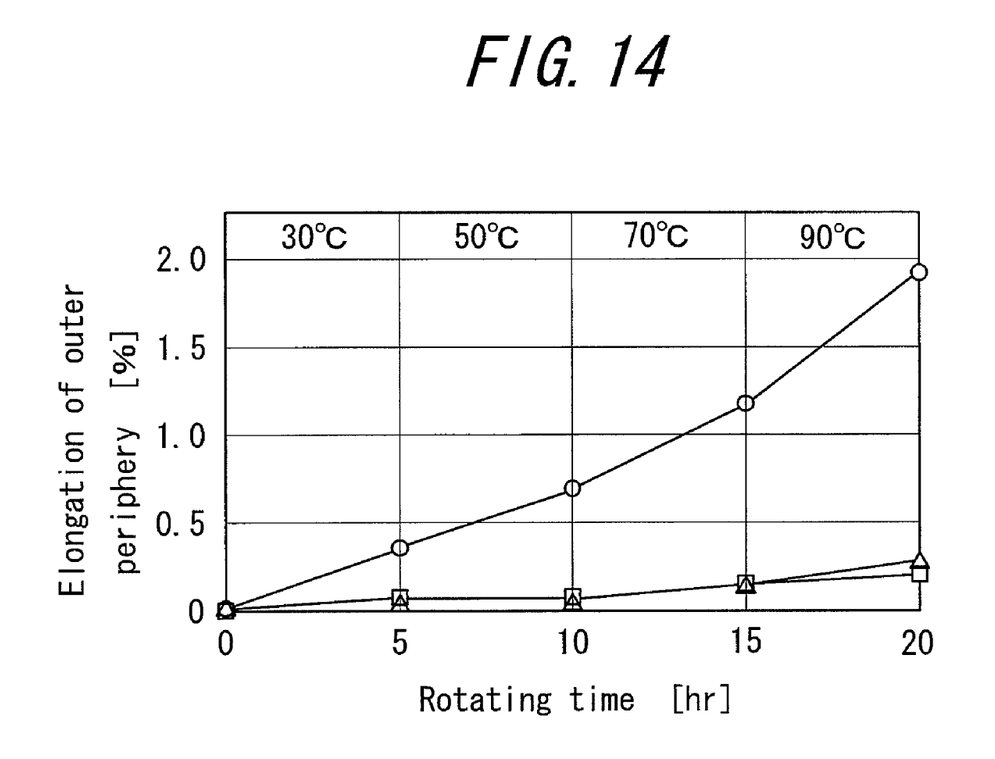
FIG. 14 is a graph showing evaluation results on creep resistance.

To the thus obtained safety tire is applied centrifugal force by rotating at 600 rpm in a temperature-adjustable thermostatic chamber. An outer peripheral length of the hollow ring body is measured every a rotating condition that the rotation is continued at each of 30, 50, 70 and 90° C. every 5 hours. The results are shown in FIG. 14. In this figure is arranged an elongation ratio (creep quantity) with respect to an initial outer peripheral length.

In FIG. 14, ○ is a Conventional Example (no pushing with sub-partition), and Δ is an Invention Example 1 (pushing with sub-partition, separate body of sub-partition: use of tire tube), and □ is an Invention Example 2 (pushing with sub-partition, one piece worked body of hollow ring and tube).

The invention claimed is:

1. A safety tire comprising a tire-approved rim assembly formed by assembling a tire onto an approved rim, a chamber defined inside the assembly through a hollow ring-shaped partition and extending along the rim in a circumferential direction, and thermally expandable hollow particles filled in the chamber, each of which particles comprise a continuous phase of a resin and a closed cell(s), characterized in that a hollow ring-shaped sub-partition is disposed on at least radially outside of an outer peripheral portion of the partition and a tire internal pressure is applied to an inside of the sub-partition.

2. A safety tire according to claim 1, wherein the sub-partition is a tube.

3. A safety tire according to claim 1, wherein the sub-partition is constituted with a double wall structure of the partition.

4. A safety tire according to claim 1, wherein the partition is provided with a filter selectively passing only a gas discharged in the thermal expansion of the hollow particles.

5. A safety tire according to claim 2, wherein the partition is provided with a filter selectively passing only a gas discharged in the thermal expansion of the hollow particles.

6. A safety tire according to claim 3, wherein the partition is provided with a filter selectively passing only a gas discharged in the thermal expansion of the hollow particles.

* * * * *